(12) United States Patent
Kuwata et al.

(10) Patent No.: US 7,327,490 B2
(45) Date of Patent: Feb. 5, 2008

(54) IMAGE PROCESSING SYSTEM VIA NETWORK

(75) Inventors: Naoki Kuwata, Nagano-ken (JP); Yoshihiro Nakami, Nagano-ken (JP); Satoru Nishio, Nagano-ken (JP); Kenji Fukasawa, Nagano-ken (JP); Yasumasa Nakajima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 802 days.

(21) Appl. No.: 10/071,459

(22) Filed: Feb. 8, 2002

(65) Prior Publication Data
US 2002/0122194 A1 Sep. 5, 2002

(30) Foreign Application Priority Data
Feb. 9, 2001 (JP) .............................. 2001-034522
Jul. 16, 2001 (JP) .............................. 2001-215331

(51) Int. Cl.
*B41J 1/00* (2006.01)
*H04N 1/32* (2006.01)
*H04N 1/40* (2006.01)
*G06F 3/00* (2006.01)

(52) U.S. Cl. ...................... 358/1.9; 358/1.15; 358/442; 358/443; 358/449; 358/1.13; 710/15

(58) Field of Classification Search ................. 358/1.9, 358/1.15, 1.12, 1.13, 434–436, 468, 404–407, 358/438, 449, 442–443, 445, 474; 348/384.1, 348/29, 30, 96–98; 382/232; 347/2–3; 710/15; 709/203, 229
See application file for complete search history.

(56) References Cited
U.S. PATENT DOCUMENTS
4,792,847 A 12/1988 Shimazaki et al.
(Continued)

FOREIGN PATENT DOCUMENTS
JP 06-008537 1/1994
(Continued)

OTHER PUBLICATIONS
Abstract of Japanese Patent Publication 10-226139, Pub. Date: Aug. 25, 1998, Patent Abstracts of Japan.
(Continued)

*Primary Examiner*—Kimberly Williams
*Assistant Examiner*—Charlotte M. Baker
(74) *Attorney, Agent, or Firm*—Martine Penilla & Gencarella, LLP

(57) ABSTRACT

The technique of the present invention ensures output of an image subjected to image processing, which does not depend upon the output environment but reflects the color reproduction characteristics of a shooting device and the intention of a photographer in shooting. The process generates an image file that includes picture data generated by a digital still camera, as well as control data and output specification information attached thereto. The control data controls the details of image processing according to the color reproduction characteristics of the camera and the intention of the photographer in shooting. The output specification information specifies, for example, the address of a printing device used as an output resource, the type of printing paper used for printing, and the number of copies. The image file is transmitted to an image processing system on a network. The image processing system carries out image processing of the picture data based on the control data, generates an output file, and transmits the output file to an specified output device via the network. Even in the environment that can not perform image processing based on the control data, the arrangement of the invention ensures output of the image that has been subjected to such image processing.

15 Claims, 3 Drawing Sheets

U.S. PATENT DOCUMENTS

| | | | |
|---|---|---|---|
| 5,982,416 A * | 11/1999 | Ishii et al. | 348/29 |
| 6,011,547 A | 1/2000 | Shiota et al. | |
| 6,256,350 B1 * | 7/2001 | Bishay et al. | 375/240.21 |
| 6,273,535 B1 * | 8/2001 | Inoue et al. | 347/3 |
| 6,384,928 B2 * | 5/2002 | Nagasawa et al. | 358/1.15 |
| 6,456,400 B1 * | 9/2002 | Ikegami et al. | 358/434 |
| 6,609,162 B1 * | 8/2003 | Shimizu et al. | 710/15 |
| 6,728,428 B1 | 4/2004 | Kinjo | |
| 6,937,997 B1 * | 8/2005 | Parulski | 705/26 |
| 7,170,632 B1 * | 1/2007 | Kinjo | 358/1.9 |
| 2005/0007617 A1 * | 1/2005 | Tanaka et al. | 358/1.13 |
| 2005/0223228 A1 * | 10/2005 | Ogawa et al. | 713/168 |
| 2006/0072156 A1 * | 4/2006 | Shima | 358/1.15 |

FOREIGN PATENT DOCUMENTS

| | | |
|---|---|---|
| JP | 09-219817 | 8/1997 |
| JP | 10-191246 | 7/1998 |
| JP | 10-226139 | 8/1998 |
| JP | 10-276295 | 10/1998 |
| JP | 11-041622 | 2/1999 |
| JP | 11-088672 | 3/1999 |
| JP | 11-098461 | 4/1999 |
| JP | 11-127415 | 5/1999 |
| JP | 11-239269 | 8/1999 |
| JP | 11-308564 | 11/1999 |
| JP | 11-317863 | 11/1999 |
| JP | 11-327605 | 11/1999 |
| JP | 11-331596 | 11/1999 |
| JP | 2000-013718 | 1/2000 |
| JP | 2000-069277 | 3/2000 |
| JP | 2000-069419 | 3/2000 |
| JP | 2000-115688 | 4/2000 |
| JP | 2000-125186 | 4/2000 |
| JP | 2000-137806 | 5/2000 |
| JP | 2000-215379 | 8/2000 |
| JP | 2000-278598 | 10/2000 |
| JP | 2000-312296 | 11/2000 |
| JP | 2001-147481 | 5/2001 |

OTHER PUBLICATIONS

Abstract of Japanese Patent Pub. No. 06-008537, Pub. Date: Jan. 18, 1994, Patent Abstracts of Japan.

Abstract of Japanese Patent Pub. No. 09-219817, Pub. Date: Aug. 19, 1997, Patent Abstracts of Japan.

Abstract of Japanese Patent Pub. No. 10-191246, Pub. Date: Jul. 21, 1998, Patent Abstracts of Japan.

Abstract of Japanese Patent Pub. No. 11-088672, Pub. Date: Mar. 3, 1999, Patent Abstracts of Japan.

Abstract of Japanese Patent Pub. No. 11-127415, Pub. Date: May 11, 1999, Patent Abstracts of Japan.

Abstract of Japanese Patent Pub. No. 11-331596, Pub. Date: Nov. 30, 1999, Patent Abstracts of Japan.

Abstract of Japanese Patent Pub. No. 2000-013718, Pub. Date: Jan. 14, 2000, Patent Abstracts of Japan.

Abstract of Japanese Patent Pub. No. 2000-137806, Pub. Date: May 16, 2000, Patent Abstracts of Japan.

Abstract of Japanese Patent Pub. No. 2001-147481, Pub. Date: May 29, 2001, Patent Abstracts of Japan.

Abstract of Japanese Patent Publication 11-041622, Pub. Date: Feb. 12, 1999, Patent Abstracts of Japan.

Abstract of Japanese Patent Publication 11-327605, Pub. Date: Nov. 26, 1999, Patent Abstracts of Japan.

Abstract of Japanese Patent Publication 2000-278598, Pub. Date: Oct. 6, 2000, Patent Abstracts of Japan.

Abstract of Japanese Patent Publication No. 10-276295, Pub. Date: Oct. 13, 1998, Patent Abstracts of Japan.

Abstract of Japanese Patent Publication No. 11-088672, Pub. Date: Mar. 30, 1999, Patent Abstracts of Japan.

Abstract of Japanese Patent Publication No. 2000-295482, Pub. Date: Oct. 20, 2000, Patent Abstracts of Japan.

Abstract of Japanese Patent Publication No. 11-098461, Pub. Date: Apr. 9, 1999, Patent Abstracts of Japan.

Abstract of Japanese Patent Publication No. 11-308564, Pub. Date: Nov. 5, 1999, Patent Abstracts of Japan.

Abstract of Japanese Patent Publication No. 11-317863, Pub. Date: Nov. 16, 1999, Patent Abstracts of Japan.

Abstract of Japanese Patent Publication No. 2000-069277, Pub. Date: Mar. 3, 2000, Patent Abstracts of Japan.

Abstract of Japanese Patent Publication No. 2000-069419, Pub. Date: Mar. 3, 2000, Patent Abstracts of Japan.

Abstract of Japanese Patent Publication No. 2000-125186, Pub. Date: Apr. 28, 2000, Patent Abstracts of Japan.

Abstract of Japanese Patent Publication No. 2000-215379, Pub. Date: Aug. 4, 2000, Patent Abstracts of Japan.

Abstract of Japanese Patent Publication No. 2000-312296, Pub. Date: Nov. 7, 2000, Patent Abstracts of Japan.

Abstract of Japanese Patent Publication No. 11-239269, Pub. Date: Aug. 31, 1999, Patent Abstracts of Japan.

* cited by examiner

IMAGE PROCESSING SYSTEM VIA NETWORK

BACKGROUND OF THE INVENTION

1. Field of the Invention

The present invention relates to a technique of outputting an image by utilizing an image file, which includes picture data and image processing information of the picture data.

2. Description of the Related Art

As a recent trend, the popular procedure generates picture data with a shooting device, such as a digital still camera (DSC), a digital video camera (DVC), or a scanner and outputs an image from an image output device, such as a CRT, an LCD, a printer, a projector, or a TV set. The output image may not accurately reproduce the brightness or the color tone of a subject, due to the difference in color reproduction characteristics between the shooting device and the image output device. Retouching of picture data is generally carried out to correct such a difference in color reproduction.

Significant skill is, however, required for such retouching. Adjustment of color reproduction is thus difficult, time-consuming and labor-consuming. Some application programs have been proposed to analyze the picture data and perform automatic correction of the color tone and the sharpness. But such correction does not give the sufficient result since the characteristics of the shooting device are not reflected. In some cases, even unnecessary correction is carried out against the intention of the photographer in shooting. One applicable procedure transmits information regarding the characteristics of the shooting device and the intension of the photographer to the image output device and causes the image output device to carry out required correction based on the transmitted information prior to output of a resulting image. This procedure, however, undesirably restricts the output resource to the output environment that can utilize such information.

These problems are not intrinsic to the shooting devices, but similar problems arise in the process of generating picture data by computer graphics.

SUMMARY OF THE INVENTION

The object of the present invention is thus to provide a technique that ensures output of an image that reflects characteristics of a device for generating picture data and the intention of an operator who makes the picture data without significantly limiting the output environment.

At least part of the above and the other related objects is attained by a first image processing system of the present invention that is connected with a printing device and a shooting device via a network. The printing device and the shooting device may be connected to the network directly or indirectly. In the latter application, for example, the printing device is locally linked with a computer connecting to the network. The network may be a wide area network like the Internet or a relatively limited network like a LAN (Local Area Network).

The image processing system of the present invention carries out image processing on picture data and causes the printing device to perform printing via the network. The picture data is associated with image processing control data. In one preferable embodiment, the picture data and the image processing control data can be included in an image file.

In order to actualize the above functions, the image processing system first receives the picture data generated by the shooting device. A digital camera or a scanner may be used for the shooting device.

After receiving the picture data, the image processing system causes the picture data to be subjected to image processing based on the image processing control data and conversion into a data format that allows supply to the printing device, thereby generating print data. The conversion includes a color conversion process, for example, from one color system of red (R), green (G), and blue (B) used for generation of the picture data to another color system of cyan (C), magenta (M), yellow (Y), and black (K) used in the printing device, as well as a halftoning process.

The image processing system transmits the print data to the printing device via the network and causes the printing device to print a resulting image. The printing device used as the output resource may be set in advance or may be specified by the user for each printing operation. The output resource may be specified by information representing the location of the printing device on the network, for example, address or a URI (Uniform Resource Indicator).

The user transmits the picture data from the shooting device to the image processing system and enables a resulting image to be printed with an arbitrary printing device, The image processing system carries out image processing based on the image processing control data associated with the picture data in the process of generating the picture data by the shooting device. This ensures the image processing that reflects the characteristics of the shooting device and the intension of the photographer in shooting. A specific format of print data is applied for data transmission from the image processing system to the printing device. This enables printing based on the image processing control data, regardless of the functions of the printing apparatus. The technique of the present invention thus ensures printing that reflects the characteristics of the shooting device and the intention of the photographer in shooting without any limitation of the printing environment.

The present invention is also directed to a second image processing system that is connected to an image output device via a network. The image output device is not restricted to the printing device but may be a display device, such as a liquid crystal projector or a display.

The second image processing system first receives input of picture data and image processing control data used for image processing of the picture data. The input of the picture data is not restricted to input from a device that generates the picture data. The picture data may be input not via the network but via some medium. The image processing system then causes the picture data to be subjected to image processing based on the image processing control data and thereby generates an output data. The image processing system transmits the output data to the image output device connecting to the network and causes the image output device to output a resulting image.

The arrangement of the second image processing system carries out image processing based on the image processing control data, regardless of the output environment.

In the second image processing system, it is preferable that the image processing module carries out conversion into a data format that allows direct supply to the image output device. This ensures output of a processed image without requiring any further processing in the image output device. When the image output device is a printing device, the color conversion and the halftoning process discussed previously are included in this conversion process. The image processing module may alternatively transmit output data in a data format that enables output from the image output device with a predetermined series of processing.

In the second image processing system, it is also preferable that the image processing module selectively changes the details of the conversion process corresponding to the type of the image output device. This enables output of a processed image to diverse image output devices. The changeover of the conversion process corresponding to the image output device may be based on a user's input of information regarding the type of the image output device. The image processing system may otherwise fetch the required information from the specified image output device.

Here the type represents a unit that affects the contents of the conversion. For example, in the case where a common format is applied for the format of output data in a manufacturer of image output devices, the type information is the manufacturer's name of the image output device.

The user may individually specify output style from the image output device. In one preferable embodiment, however, the picture data is associated with output specification information for specifying output style, and the image processing system controls the output from the image output device based on this output specification information. The output specification information includes, for example, information for specifying the output resource and information regarding the date and time of output. When a printing device is used as the image output device, the output specification information may include the size and the type of printing paper used for printing and the number of copies.

In the case where the picture data is defined in an YCbCr color space, the image processing carried out in the image processing system of the present invention includes color space conversion from the YCbCr color space to an RGB color space. The arrangement of executing the color space conversion in the image processing system enables the color reproduction characteristics at the time of generating the image file to be kept regardless of the output environment.

For example, an sRGB color space is typically used as the RGB color space. Some picture data requires a wider range of color reproduction than that of the sRGB color space. The arrangement of performing the color conversion in the image processing system enables the color reproduction characteristics to be kept even in such cases. In order to allow the processing in a wider range of color reproduction, it is desirable that the color space conversion process includes conversion into a predetermined RGB space having a wider range of color reproduction than the sRGB color space. The color space conversion process is not restricted to the conversion into the color space having the wider range of color reproduction, but includes a diversity of conversion processes, for example, conversion into a color space having a relatively narrow range of color reproduction but a high resolution. Any of the diverse conversion processes may be applied selectively.

The technique of the present invention is actualized by an image processing method and an image output method, in addition to the image processing system discussed above. The technique of the present invention is further attained by a computer program that utilizes a computer to construct the image processing system discussed above and by a recording medium in which such a computer program is recorded. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of a preferred embodiment with the accompanying drawings.

DESCRIPTION OF THE PREFERRED EMBODIMENTS

Figure 1:
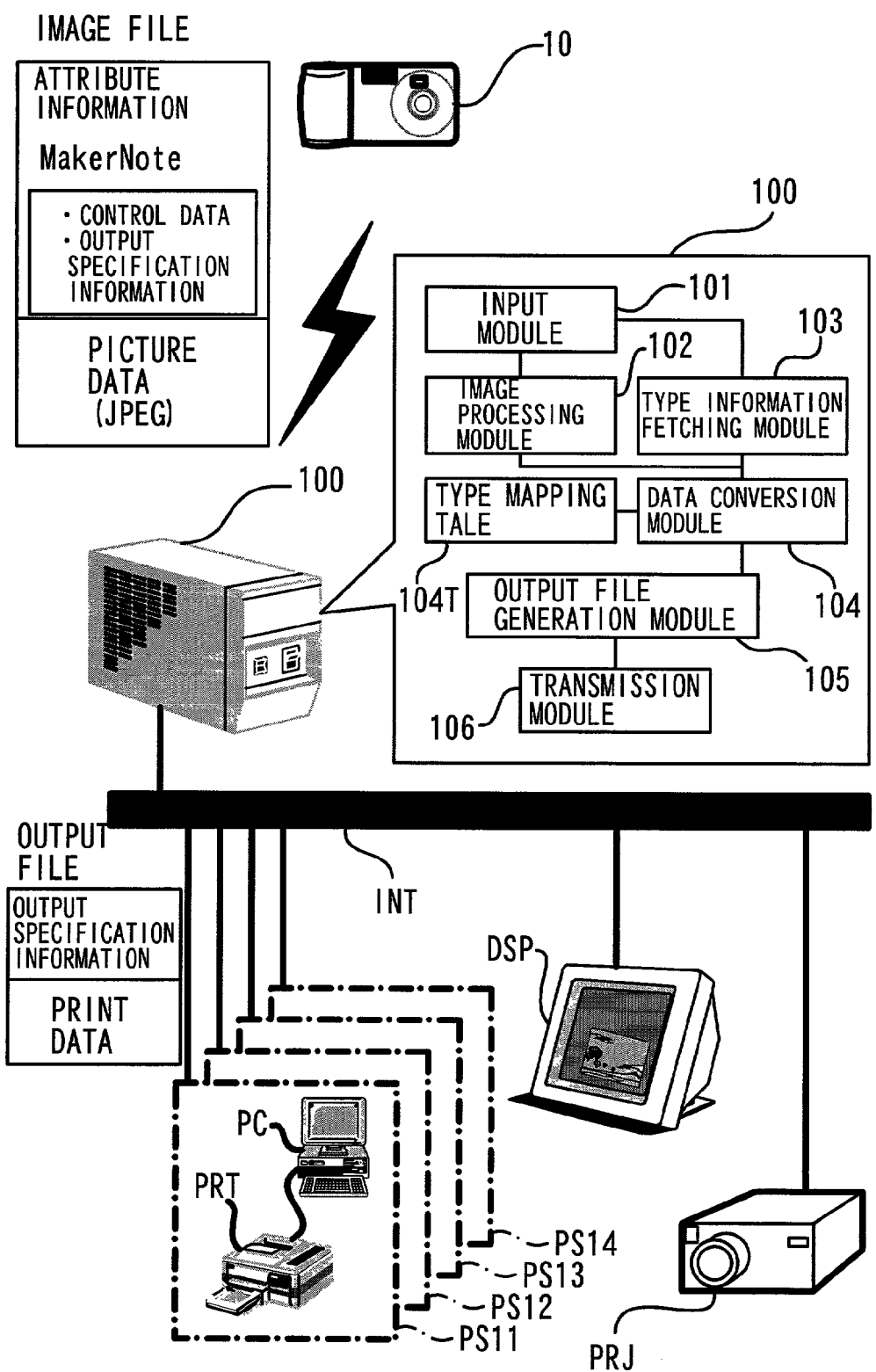
FIG. 1 schematically illustrates the construction of an image output system in one embodiment of the present invention.

One mode of carrying out the invention is discussed below as a preferred embodiment in the following order:

A. Construction of System
  A1. Structure of Image File
  A2. Structure of Image Processing System B. Structure of Digital Still Camera C. Image Processing D. Effects E. Modifications A. Construction of System FIG. 1 schematically illustrates the construction of an image output system in one embodiment of the present invention. The image output system includes an image file generation device, an image processing system 100, and an image output device, which are mutually connected via a network INT. In this embodiment, a digital still camera 10 is used as the image file generation device. The image file generation device is, however, not restricted to the digital still camera 10 but may be any camera device like a digital video camera or a scanner. Available examples of the image output device include a printer PRT, a network display DSP, and a liquid crystal projector PRJ. The image file generation device and the image output device are connected to the network INT directly or via a computer. In this embodiment, the network INT may be a wide area network like the Internet or a restricted network like online communication or a LAN (Local Area Network).

A1. Structure of Image File

The image processing system 100 is a server having the functions of receiving image files from the digital still camera 10 and transmitting processed image files to the image output device. A typical structure of the image file input into the image processing system 100 is illustrated in FIG. 1. The image file has a data structure, in which picture data with attribute information mapped thereto is stored. In this embodiment, the image files adopt a specific file structure in conformity with the Exif (Exchangeable Image File) format standard for digital still cameras. The Exif was established by JEIDA (Japan Electronic Industry Development Association). Although the Exif standard applies the JPEG format to record the picture data, the image files are not restricted to this format.

The attribute information includes pieces of information regarding camera conditions, like the date and time of photographing, exposure, and the shutter speed, control data of image processing, and output specification information. In this embodiment, based on the Exif standard, the control data and the output specification information among the attribute information are recorded in an area MakerNote. The recording area and its format may be arbitrarily set according to the selected format.

The control data controls the details of image processing on picture data at the time of outputting an image. In this embodiment, the control data mainly includes two types of data, that is, a color space parameter and a color correction parameter.

The color space parameter is used to transmit a color reproduction characteristic in the image file generation device to the image output device and thereby actualize precise color reproduction of a subject. This parameter includes a gamma correction value corresponding to the characteristic of the image file generation device and a specification parameter for the color space conversion method. The specification parameter for the color space conversion method specifies the method of color conversion applied for image processing according to the width of the color reproduction range by the image file generation device. This embodiment uses color spaces of sRGB and NTSC. These two color spaces have different color reproduction ranges. Application of the same color conversion method for image processing may undesirably narrow the color reproduction range of one color space. The specification parameter is accordingly used to specify the adequate color conversion method and ensure image processing without narrowing the color reproduction range in shooting. A diversity of formats may be used for setting the specification parameter. In this embodiment, the specification parameter determines which of the sRGB and NTSC color spaces is used for shooting. A conversion matrix used for conversion of the color space may alternatively be set as the specification parameter.

The color correction parameter is data used for transmitting the intention of the photographer to the image output device. This parameter, for example, includes parameters regarding the contrast, the brightness, the color balance, the saturation, the sharpness, and the registered color. The registered color represents a color used as the reference for tone adjustment of picture data. These parameters are only illustrative. The control data may include other parameters or include only part of the parameters described above.

The output specification information functions to control the specification of output from the image output device. When the image output device is a printer, for example, the output specification information specifies the size and type of printing paper used for printing, the number of copies, and the time required for printing. The output specification information may also include address for specifying the output resource and information regarding the date and time of the output. It is, however, not necessary that the specification of the output resource is included in the output specification information. The output resource may individually be specified in the process of receiving picture data from the image file generation device.

A2. Structure of Image Processing System

The functional blocks of the image processing system 100 are also illustrated in FIG. 1. The respective functional blocks are actualized by software configuration in the image processing system 100. An input module 101 receives input of image files from outside; for example, input from the digital still camera 10 via the network or input via a recording medium.

The input image file is subjected to image processing by an image processing module 102. The image processing module 102 extracts the control data for image processing from the input image file and processes the picture data based on the extracted control data.

The output specification information included in the image file is transmitted to a type information fetching module 103. The type information fetching module 103 gains access to each image output device based on the address for specifying the output resource included in the output specification information and fetches type information of the image output device. The type information affects the conversion process discussed below, and includes information regarding the type of the image output device and information affecting the image output characteristics of the image output device.

A data conversion module 104 carries out data conversion according to the type of the image output device. Namely the data conversion module 104 converts picture data into an adequate format that enables immediate output from the image output device. When the image output device is a printer, the conversion process includes, for example, color conversion from RGB into CMYK and a halftoning process. The data conversion module 104 refers to a type mapping table 104T to actualize the type-based processing. For example, when the image output device is a printer, the type mapping table 104T stores information regarding the type of ink, such as dye ink and pigment ink, the number of ink colors used for printing, the printing resolution, and the conversion table applied for color conversion mapped to each type processible by the image processing system 100. The image processing system 100 can readily process newly available printers by updating the contents of this type mapping table 104T. The series of processing in the data conversion module 104 may alternatively be carried out in the image output device.

An output file generation module 105 arranges the processed data and constructs an output file, which is transmittable to the image output device. The data converted by the data conversion module 104 may be specified as the output file, or the converted data with part of the output specification information attached thereto may be specified as the output file. The structure of the output file for the printer PRT specified as the image output device is also illustrated in FIG. 1. In this example, the output file includes print data and the output specification information. Here the print data represents data converted into a specific format that allows immediate printing by the printer PRT. The output specification information is attached to a header of the print data in the output file. The attached output specification information may be, for example, the type of printing paper used for printing and the number of copies.

A transmission module 106 transmits the output file to the image output device via the network INT. The image output device receives the transmitted output file and prints or otherwise outputs a resulting image. When the output file includes the output specification information, the specification of output, for example, changeover of printing paper, is controlled by the output specification information.

B. Structure of Digital Still Camera

Figure 2:
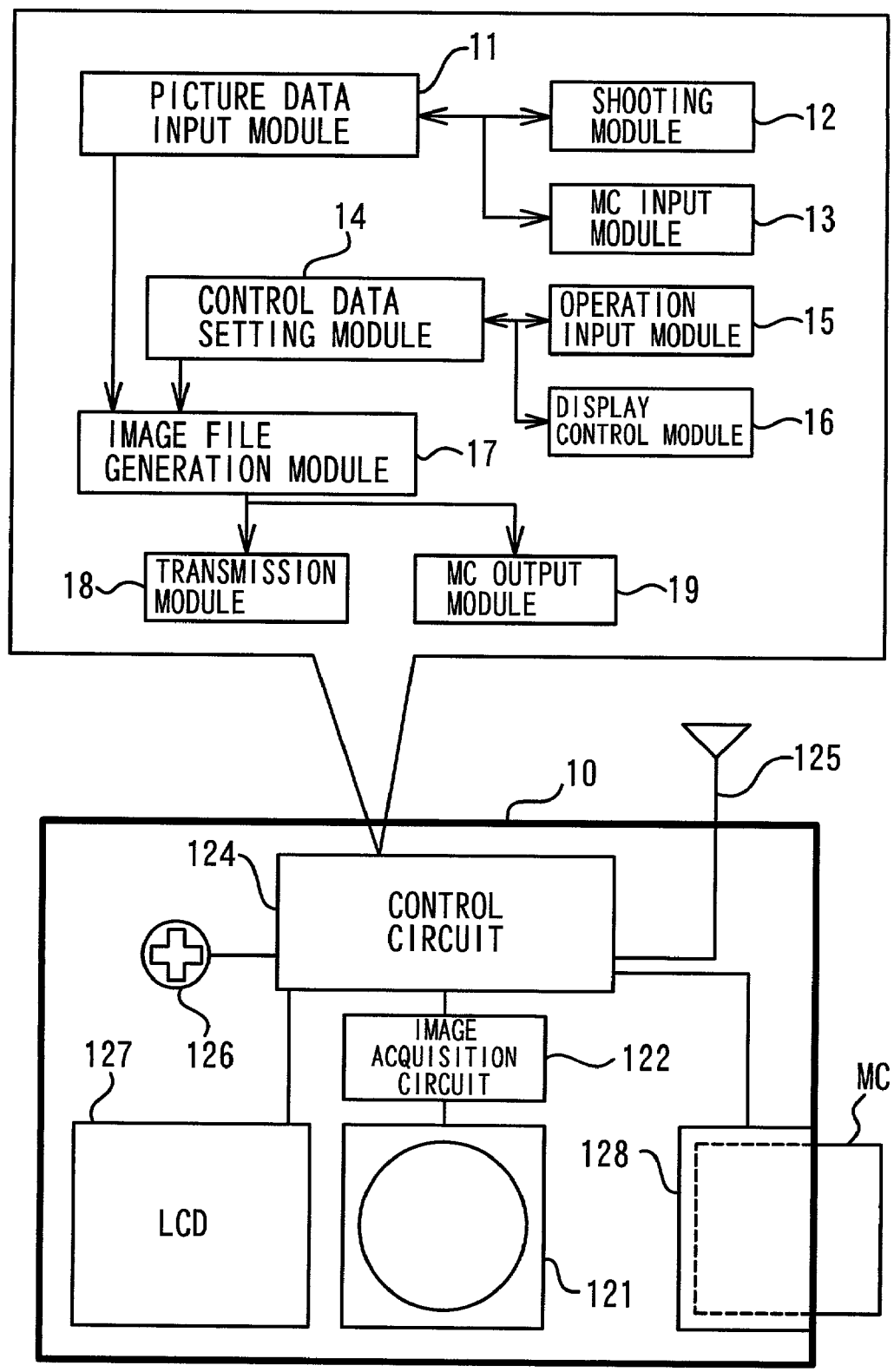
FIG. 2 illustrates the structure of a digital still camera 10 used as an image file generation device.

FIG. 2 illustrates the structure of the digital still camera 10 used as the image file generation device. In the digital still camera 10, picture data is generated by means of an optical circuit 121 including a CCD for collecting information of light rays and an image acquisition circuit 122 for converting voltage signals of the CCD into picture data.

The picture data obtained here is defined in a YCbCr color space, which is suitable for image compression based on a JPEG format. A different series of processing to obtain picture data in the YCbCr color space from the voltage signal of the CCD is adopted corresponding to the type of the digital still camera 10.

The digital still camera 10 generally obtains picture data defined in the RGB color space from the voltage signal of the CCD. An sRGB color space and an NTSC color space are selectively used according to the type of the camera. Both the sRGB color space and the NTSC color space define color in the RGB coordinate system, while the NTSC color space has a wider range of color reproduction than the sRGB color space. In the sRGB color space, color is generally defined in the range of 8 bits (0 to 255). A color space that extends this range to negative values or values of and over 256 (hereinafter referred to as the 'extended sRGB space') may be used instead of the general sRGB color space. Information on the color space used for shooting is included as the color space parameter described previously and attached to the picture data as information representing the color reproduction characteristics of the digital still camera 10. In this embodiment, the extended sRGB space and the sRGB space are in the identical coordinate system and are expressed by the same parameters. These two color spaces may alternatively be expressed in a discriminative manner from each other.

The 3×3 matrix computation converts the image obtained in the RGB color space into data in the YCbCr color space. Namely this matrix is used to convert the RGB coordinate system into the YCbCr coordinate system. A common matrix is applicable for both the sRGB color space and the NTSC color space used for shooting.

The user operates an operation unit 126 to set the shooting mode, an image processing control parameter, and the layout. Information required for the setting is displayed on an LCD 127. The picture data thus obtained may be transmitted wirelessly by an aerial 125 to the image processing system 100 via the network INT. The picture data may be recorded in a memory card MC inserted in a memory card slot 128.

A control circuit 124 controls the operations of the digital still camera 10. The control circuit 124 is constructed as a microcomputer including a CPU and memories. The functional blocks actualized by the software configuration for such control in the control circuit 124 are also illustrated in FIG. 2.

A picture data input module 11 receives input of picture data via a shooting module 12 or an MC input module 13. In the case of the shooting module 12, picture data is generated by shooting that utilizes the optical circuit 121. In the case of the MC input module 13, picture data is read from the memory card MC.

A control data setting module 14 sets the control data included in the image file, in addition to the picture data. The control data is used to control the details of the image processing, which is carried out for the picture data in the process of outputting the image. The user sets the control data, for example, at the time of shooting. An operation input module 15 and a display control module 16 give a user interface for the setting. The display control module 16 utilizes the LCD 127 to give information to the user, whereas the operation input module 15 inputs the operation of the operation unit 126.

The user may arbitrarily set each item of the control data or select a desirable setting among a plurality of settings of the control data provided in advance. The setting of the control data may be selected, based on the relationship to the image output device specified as the output resource, for example, the type of ink, dye ink or pigment ink, used in the printer specified as the output resource and the number of ink colors. The selection may also be based on the type of the image output device, for example, a color printer, a display, or a projector. The multiple settings of the control data may be mapped to one picture data.

An image file generation module 17 specifies the mapping of the data from the control data setting module 14 to the data from the picture data input module 11 and generates an image file. The structure of the image file is discussed previously with reference to FIG. 1.

The image file thus generated is output to outside via a transmission module 18 or an MC output module 19. The transmission module 18 controls wireless communication via the aerial 125. The transmission module 18 functions to implement transmission of the image file to the image processing system 100 via the network INT. The MC output module 19 controls writing into the memory card MC. The image file written in the memory card MD can be transmitted to the image processing system 100 or any other suitable external device.

D. Image Processing

Figure 3:
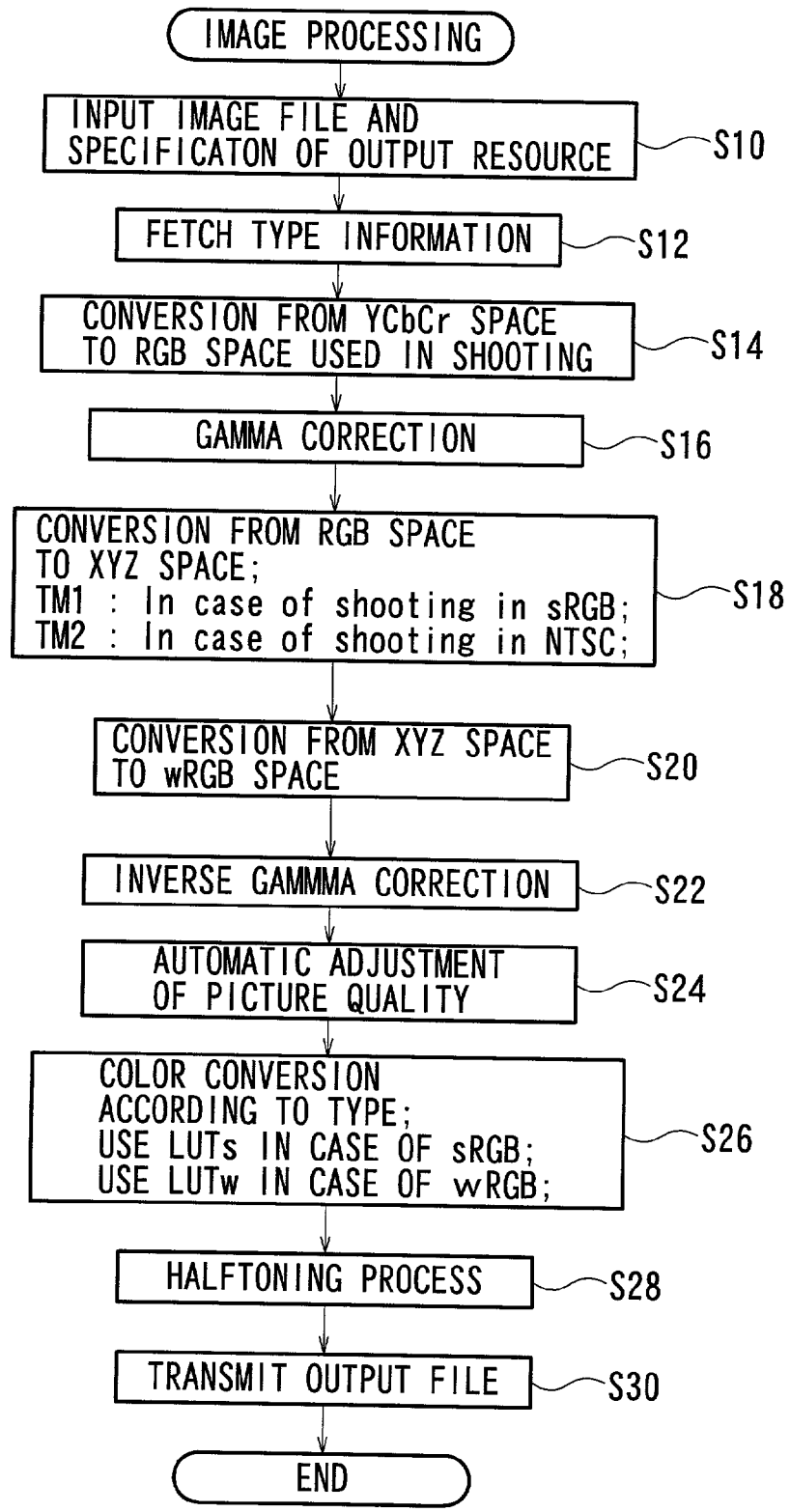
FIG. 3 is a flowchart showing an image processing routine.

FIG. 3 is a flowchart showing an image processing routine, which is executed by the image processing system 100. The image processing system 100 first receives input of an image file and specification of an output resource at step S10. The image file may be transmitted from the digital still camera 10 via the network or read from the memory card MC. The output resource is specified by information like a URI (Uniform Resource Indicator) or an IP address representing the location of the image output device on the network INT. In this embodiment, such information is included in the output specification information in the image file. Alternatively such information may be specified by an operation of the digital still camera 10 in the course of receiving the image file. The image processing system 100 analyzes the image file and extracts the picture data and the control data from the input image file.

The image processing system 100 fetches the type information based on the specification of the output resource at step S12. In the procedure of this embodiment, the image processing system 100 gains access to the specified output resource via the network INT to fetch the type information. The type information includes information regarding the type of the image output device, for example, a printer, a display, or a scanner, and information regarding the name of the manufacturer of the image output device. When a printer is used as the image output device, the type information includes information regarding the type of ink, that is, pigment ink or dye ink, used for printing, the number of ink colors used for printing, and the printing resolution. The type information is utilized in a color conversion process and a halftoning process discussed later.

The image processing system 100 subsequently carries out image processing based on the information thus obtained. As mentioned previously, in this embodiment, the picture data is defined in the YCbCr color space. The image processing system 100 thus converts the picture data in the YCbCr color space into data in the RGB color space used for shooting at step S14. An inversion matrix, which is inverse to a matrix used for conversion from the RGB space to the YCbCr space in the digital still camera 10, is applied for this conversion. This process converts the picture data into the data in the color space used for shooting, that is, one of the NTSC color space, the sRGB color space, and the extended sRGB color space. In the case of conversion into the extended sRGB color space, the color reproduction range includes negative values and values of and over 256.

The image processing system then performs gamma correction of the picture data at step S16. The gamma value used for the gamma correction is included in the control data as information representing the characteristic of the digital still camera 10.

After completion of the gamma correction, the image processing system 100 converts the color space of the picture data into the wRGB color space, which is defined to have the wider color reproduction range than the sRGB color space. When the picture data defined in either the NTSC color space or the extended sRGB color space is processed in the sRGB color space having the narrower color reproduction range, the colors of the subject may not be reproduced accurately. From this point of view, the picture data generated in the sRGB color space may skip a series of processing discussed below. In this embodiment, however, the color space information included in the control data does not discriminate the sRGB color space from the extended sRGB color space. The procedure of this embodiment accordingly carries out conversion of the picture data generated in the sRGB color space into data in the wRGB color space. Even under such conditions, since the picture data in the extended sRGB color space includes negative values or values of or over 256, the extended sRGB color space may be distinguished from the sRGB color space based on these tone values.

Matrix computation is applied for the conversion into the wRGB color space. As described previously, the image processing system 100 deals with picture data defined in either the sRGB color space or the extended sRGB color space and the picture data defined in the NTSC color space. Matrixes for directly converting the picture data in the respective color spaces into data in the wRGB color space may be specified. The procedure of this embodiment, however, carries out conversion via a standard XYZ color space.

The image processing system 100 first carries out conversion from the RGB color space to an XYZ color space at step S18. The conversion process depends upon the color space in which the picture data is defined. The procedure of this embodiment accordingly provides two conversion matrixes in advance, that is, a conversion matrix TM1 for the sRGB color space or the extended sRGB color space and another conversion matrix TM2 for the NTSC color space, and selectively uses one of the two conversion matrixes TM1 and TM2 to implement conversion according to the color space used for shooting. The conversion changes the individual color spaces, in which the picture data is generated, into the standard XYZ color space.

The image processing system 100 then carries out conversion from the XYZ color space to the wRGB color space at step S20. Matrix computation is also applied for this conversion. An identical matrix is used for this conversion, irrespective of the color space in shooting. The matrix used for the computation may be set arbitrarily according to the definition of the wRGB color space.

As described above, the picture data obtained in the sRGB color space is not required to be converted into data in any wider color space, so that the processing of steps S18 and S20 may be skipped. In the case where the NTSC color space is utilized as the wider color space than the sRGB color space, the picture data obtained in the NTSC color space may skip the processing of steps S18 and S20. The processing of steps S18 and S20 can be omitted according to the relationship between the color space used for shooting and the color space finally used for the output.

After completion of the color space conversion process, the image processing system 100 carries out inverse gamma correction at step S22. The gamma value used here is set, based on the color reproduction characteristics of the image output device. In this embodiment, the image processing system 100 receives the gamma value from the image output device in the process of fetching the type information at step S12. In the case where the type of the image output device is known at the time of shooting, the type information may be included in the control data attached to the picture data.

The image processing system 100 subsequently carries out automatic adjustment of the picture quality to reflect the intention of the photographer in shooting at step S24. In this embodiment, the adjustment parameter with regard to, for example, the contrast is included as the color correction parameter in the control data. The image processing system 100 implements automatic adjustment of the picture quality, based on this parameter. The method of adjusting the picture quality based on such a parameter is known in the art and is thus not specifically described here.

This series of processing completes the correction of picture data that reflects the color reproduction characteristics of the digital still camera 10 and the intention of the photographer in shooting. The image processing system 100 may output the resulting picture data to the image output device without any further processing. The procedure of the embodiment, however, converts the processed picture data into a specific format that allows direct output from the image output device.

The details of such conversion are discussed below in an example of the printer as the image output device. The image processing system 100 causes the RGB picture data to be subjected to a color conversion process corresponding to the type of the printer at step S26. This process converts the RGB color system into the CMYK color system used in the printer. The conversion is performed by referring to a conversion lookup table (LUT) that maps the colors of one color system to the colors of the other color system. The procedure of this embodiment typically uses a conversion table LUTw for conversion of the wRGB color space into the CMYK color space. The image processing system 100 also stores another conversion table LUTs for the sRGB color space, in order to allow processing of picture data defined in the sRGB color space. The image processing system 100 selectively uses the adequate conversion table corresponding to the color space in which the picture data is defined. The conversion table LUTs may be used, for example, when the color space conversion process of steps S18 and S20 is skipped for the picture data obtained in the sRGB color space and when the input image file is output without any processing for adjusting the picture quality.

The LUT depends upon not only the color space of picture data but the type of the printer, since the type of ink and the number of ink colors may be varied in each type of the printer. The image processing system 100 thus selectively uses the adequate LUT corresponding to the type of the printer and carries out the color conversion process at step S26.

The image processing system 100 then carries out halftoning of the picture data converted to the tone values of CMYK at step S28. The halftoning process enables the tone values of picture data to be expressed by the density of dots formed by the printer. Any known method like the error diffusion method or the systematic dither method may be applied for the halftoning process.

In addition to the above series of processing, the image processing system 100 may carry out a resolution conversion process, which converts the resolution of picture data into a printing resolution adopted in the printer, and an interlace data generation process, which sets a data arrangement and feeding quantities of sub-scan to enable interlace recording in the printer.

The picture data is converted into a specific format of print data that enables immediate output from the printer through the conversion at steps S26 and S28. The image processing system 100 then transmits the resulting converted data as the output file to the specified image output device via the network INT at step S30. The image output device implements printing based on the transmitted data.

At least part of the output specification information, in addition to the print data, may be included in the output file according to the requirements. For example, the output specification information regarding the number of copies and the type of printing paper used for printing may be included in the output file to ensure output according to the specification. Arbitrary setting may be applied to make the output specification information included in the output file; for example, the output specification information may be added to the header of the print data.

D. Effects

In the image output system of the embodiment discussed above, the control data includes the color reproduction characteristics of the image file generation device and the intension of shooting to ensure output of an image reflecting such specification. The image processing system 100 on the network enables image processing based on the control data without depending upon the output environment, for example, the processing capacity of the image output device.

The image output system of the embodiment utilizes the image output device connecting with the network. The user can thus output images from an arbitrary image output device. This arrangement enables images to be output to any third person who is at a remote place. The output does not depend upon the output environment of the receiver who receives images, but reflects the color reproduction characteristics in shooting.

In the image output system of the embodiment, data transmission from the image processing system 100 to the image output device is implemented in the specific data format that allows immediate output from the image output device. This advantageously relieves the load of processing in the image output device.

E. Modifications

The above embodiment regards output of images to the printing apparatus. A display or a projector connecting with the network may be applied for output of images.

The diverse series of image processing discussed in the above embodiment may not be all executed in the image processing system 100, but part of the image processing may be performed in the image file generation device or in the image output device.

In this embodiment, the image processing system 100 is constructed by a single server. The image processing system may alternatively include multiple servers for distributed processing.

Although the above embodiment regards application to still pictures, the principle of the present invention is also applicable to moving picture data like MPEG. One exemplified procedure adds output control data including image processing control data to a moving picture file and controls output of all or part of the frames of the moving picture.

The above embodiment and its modifications are to be considered in all aspects as illustrative and not restrictive. There may be many modifications, changes, and alterations without departing from the scope or spirit of the main characteristics of the present invention. For example, the diverse control processes discussed above may be attained by the hardware structure, instead of the software configuration.

The scope and spirit of the present invention are indicated by the appended claims, rather than by the foregoing description.

What is claimed is:

1. An image processing system that carries out image processing on picture data, said image processing system being connected with a printing device and a shooting device via a network, said image processing system comprising:

a receiver module that receives input of the picture data generated in said shooting device and image processing control data associated with the picture data via the network, the image processing control data being used to control details of image processing on the picture data at a time of outputting an image, the image processing control data being generated by said shooting device;

a device type acquisition module that accesses said printing device to fetch a type of said printing device;

an image processing module that causes the picture data to be subjected to image processing based on the image processing control data and converted into a data format that allows supply to said printing device, and thereby generates print data, said image processing module changing over details of the conversion corresponding to the type of said printing device; and a transmission module that transmits the print data to said printing device via the network and causes said printing device to print a processed image.

2. An image processing system that carries out image processing on picture data, comprising:

an image input module that receives input of the picture data and image processing control data associated with the picture data, the image processing control data being used to control details of image processing on the picture data at a time of outputting an image, the picture data and the image processing control data being generated by a shooting device;

a device type acquisition module that accesses an image output device to fetch a type of said image output device;

an image processing module that causes the picture data to be subjected to image processing based on the image processing control data and converted into a data format that allows supply to said image output device, and thereby generates image output data, said image processing module changing over details of the conversion corresponding to the type of said image output device; and a transmission module that transmits the image output data to said image output device connecting with said image processing system via a network and causes said image output device to output a processed image.

3. An image processing system in accordance with claim 2, wherein the picture data is associated with output specification information that specifies output style from said image output device, and said transmission module controls the output style from said image output device based on the output specification information.

4. An image processing system in accordance with claim 2, wherein the picture data is defined in a YCbCr color space, and
the image processing includes color space conversion of the YCbCr color space into an RGB color space.

5. An image processing system in accordance with claim 4, wherein the color space conversion includes conversion into a predetermined RGB space that has a wider range of color reproduction than an sRGB color space.

6. An image output method that utilizes an image processing system connecting with an image output device via a network to output an image based on picture data, said image output method comprising:
inputting the picture data and image processing control data associated with the picture data, the image processing control data being used to control details of image processing on the picture data at a time of outputting an image, the picture data being associated with output specification information that specifies output style from said image output device, the output specification information including a size and a type of printing paper, the picture data and the image processing control data being generated by a shooting device;
causing the picture data to be subjected to image processing based on the image processing control data and converted into a data format that allows supply to said image output device, and thereby generates image output data; and
transmitting the image output data to said image output device connecting with said image processing system via a network and causing said output device to output a processed image, said transmission module controlling the output style from said image output device based on said output specification information.

7. A computer program, stored on a computer readable medium, that causes an image processing system to output an image to an image output device connecting with said image processing system via a network, said computer program including program instructions for causing a computer to implement the functions of:
inputting picture data and image processing control data associated with the picture data, the image processing control data being used to control details of image processing on the picture data at a time of outputting an image, the picture data being associated with output specification information that specifies output style from said image output device, the output specification information including a size and a type of printing paper, the picture data and the image processing control data being generated by a shooting device;
causing the picture data to be subjected to image processing based on the image processing control data and converted into a data format that allows supply to said image output device, and thereby generates image output data; and
transmitting the image output data to said image output device connecting with said image processing system via said network and causing said output device to output a processed image, said transmission module controlling the output style from said image output device based on said output specification information.

8. An image output method that utilizes an image processing system connecting with an image output device via a network to output an image based on picture data, said image output method comprising:
inputting the picture data and image processing control data associated with the picture data, the picture data and the image processing control data being generated by a shooting device;
accessing an image output device to fetch a type of said image output device;
causing the picture data to be subjected to image processing based on the image processing control data and converted into a data format that allows supply to said image output device, and thereby generating image output data, said image processing including changing over details of the conversion corresponding to the type of said image output device; and
transmitting the image output data to said image output device and causing said image output device to output a processed image.

9. A computer program, stored on a computer readable medium, that causes an image processing system to output an image to an image output device connecting with said image processing system via a network, said computer program including program instructions for causing a computer to implement the functions of:
inputting picture data and image processing control data used for image processing of the picture data, the picture data and the image processing control data being generated by a shooting device;
accessing an image output device to fetch a type of said image output device;
causing the picture data to be subjected to image processing based on the image processing control data and converted into a data format that allows supply to said image output device, and thereby generating image output data, said image processing including changing over details of the conversion corresponding to the type of said image output device; and
transmitting the image output data to said image output device and causing said image output device to output a processed image.

10. An image processing system that carries out image processing on picture data, the image processing system being connected to an output device via a network, the image processing system comprising:
an image input module that receives input of an image file containing the picture data, image processing control data associated with the picture data, and output specification information specifying a particular image output device as a destination for output, the image processing control data to be used to control details of image processing on the picture data at the time of outputting an image, the picture data and the image processing control data being generated by a shooting device;
a device type acquisition module that accesses said image output device to fetch a type of said image output device;
an image processing module that causes the picture data to be subjected to image processing based on the image processing control data and converted into a data format that allows supply to said image output device, and thereby generates image output data, said image processing module changing over details of the conversion corresponding to the type of said image output device; and a transmission module that transmits the image output data to the particular image output device according to the output specification information.

11. An image processing system according to claim 10, wherein the output specification information includes information specifying a type of the output device.

12. An image output method that utilizes an image processing system connecting with an output device via a network to output an image based on picture data, said image output method comprising:

inputting an image file containing the picture data, image processing control data associated with the picture data, and output specification information specifying a particular image output device as a destination for output, the image processing control data to be used to control details of image processing on the picture data at the time of outputting an image, the picture data and the image processing control data being generated by a shooting device;

accessing an image output device to fetch a type of said image output device;

causing the picture data to be subjected to image processing based on the image processing control data and converted into a data format that allows supply to said image output device, and thereby generating image output data; said image processing including changing over details of the conversion corresponding to the type of said image output device; and transmitting the image output data to said particular image output device according to the output specification information.

13. A computer program, stored on a computer readable medium, that causes an image processing system to output an image to an output device connecting with said image processing system via a network, said computer program attaining the functions of:

inputting an image file containing the picture data, image processing control data for use in image processing of the picture data, and output specification information specifying a particular image output device as a destination for output, the image processing control data to be used to control details of image processing on the picture data at the time of outputting an image, the picture data and the image processing control data being generated by a shooting device;

accessing an image output device to fetch a type of said image output device;

causing the picture data to be subjected to image processing based on the image processing control data and converted into a data format that allows supply to said image output device, and thereby generating image output data; said image processing including changing over details of the conversion corresponding to the type of said image output device; and transmitting the image output data to said particular image output device according to the output specification information.

14. An image processing system that carries out image processing on picture data, said image processing system being connected with a printing device and a shooting device via a network, said image processing system comprising:

a receiver module that receives input of the picture data generated in said shooting device and image processing control data associated with the picture data via the network, the image processing control data being used to control details of image processing on the picture data at a time of outputting an image, the picture data being associated with output specification information that specifies output style from said printing device, the output specification information including a size and a type of printing paper, the image processing control data being generated by said shooting device;

an image processing module that causes the picture data to be subjected to image processing based on the image processing control data and converted into a data format that allows supply to said printing device, and thereby generates print data; and a transmission module that transmits the print data to said printing device via the network and causes said printing device to print a processed image, said transmission module controlling the output style from said printing device based on said output specification information.

15. An image processing system that carries out image processing on picture data, comprising:

an image input module that receives input of the picture data and image processing control data associated with the picture data, the image processing control data being used to control details of image processing on the picture data at a time of outputting an image, the picture data being associated with output specification information that specifies output style from an image output device, the output specification information including a size and a type of printing paper, the picture data and the image processing control data being generated by a shooting device;

an image processing module that causes the picture data to be subjected to image processing based on the image processing control data and converted into a data format that allows supply to said image output device, and thereby generates image output data; and a transmission module that transmits the image output data to said image output device connecting with said image processing system via a network and causes said image output device to output a processed image, said transmission module controlling the output style from said image output device based on said output specification information.

* * * * *